United States Patent
Wozniczka et al.

(10) Patent No.: US 6,607,858 B2
(45) Date of Patent: *Aug. 19, 2003

(54) ELECTROCHEMICAL FUEL CELL STACK WITH IMPROVED REACTANT MANIFOLDING AND SEALING

(75) Inventors: Boguslaw M. Wozniczka, Coquitlam (CA); Mehrzad Tabatabaian, Port Moody (CA); Neil V. Davis, New Westminster (CA)

(73) Assignee: Ballard Power Systems Inc., Burnaby (CA)

( * ) Notice: Subject to any disclaimer, the term of this patent is extended or adjusted under 35 U.S.C. 154(b) by 16 days.

This patent is subject to a terminal disclaimer.

(21) Appl. No.: 09/822,596

(22) Filed: Mar. 30, 2001

(65) Prior Publication Data

US 2001/0019792 A1 Sep. 6, 2001

Related U.S. Application Data

(63) Continuation of application No. 09/471,564, filed on Dec. 23, 1999, now Pat. No. 6,232,008, which is a continuation-in-part of application No. 09/116,270, filed on Jul. 16, 1998, now Pat. No. 6,066,409.
(60) Provisional application No. 60/052,713, filed on Jul. 16, 1997.

(51) Int. Cl.[7] ................................ H01M 2/14
(52) U.S. Cl. ..................... 429/39; 429/32; 429/34; 429/36; 429/38
(58) Field of Search ............... 429/39, 32, 36, 429/38, 34

(56) References Cited

U.S. PATENT DOCUMENTS

| | | | |
|---|---|---|---|
| 5,238,754 A | 8/1993 | Yasuo et al. | 429/30 |
| 5,252,409 A | 10/1993 | Akagi | 429/32 |
| 5,252,410 A | 10/1993 | Wilkinson et al. | 429/33 |
| 5,419,980 A | 5/1995 | Okamoto et al. | 429/32 |
| 5,432,021 A | 7/1995 | Wilkinson et al. | 429/17 |
| 5,445,904 A | 8/1995 | Kaufman | 429/34 |
| 5,484,666 A | 1/1996 | Gibb et al. | 429/34 |
| 5,514,486 A | 5/1996 | Wilson | 429/30 |
| 5,514,487 A | 5/1996 | Washington et al. | 429/39 |
| 5,534,362 A | 7/1996 | Okamoto et al. | 429/32 |
| 5,686,199 A | 11/1997 | Cavalca et al. | 429/30 |
| 5,736,269 A | 4/1998 | Okamoto et al. | 429/32 |
| 5,750,281 A | 5/1998 | Washington et al. | 429/39 |
| 5,906,898 A | 5/1999 | Pondo | 429/34 |
| 6,066,409 A * | 5/2000 | Ronne et al. | 429/39 |
| 6,232,008 B1 * | 5/2001 | Wozniczka et al. | 429/39 |

FOREIGN PATENT DOCUMENTS

WO    WO 97/27639    7/1997

\* cited by examiner

*Primary Examiner*—Bruce F. Bell
(74) *Attorney, Agent, or Firm*—McAndrews, Held & Malloy, Ltd.

(57) ABSTRACT

An electrochemical fuel cell stack with improved reactant manifolding and sealing includes a pair of separator plates interposed between adjacent membrane electrode assemblies. Passageways fluidly interconnecting the anodes to a fuel manifold, and interconnecting the cathodes to an oxidant manifold, comprise at least one fluid passageway formed between adjoining non-active surfaces of the pairs of separator plates. The passageways extend through one or more ports penetrating the thickness of one of the plates thereby fluidly connecting the manifold to the opposite active surface of that plate, and the adjacent electrode. The ports comprise walls that have surfaces that are angled more than 0 degrees and less than 90 degrees with respect to the direction of fluid flow in the fluid passageway upstream of the port. During operation, electrochemical fuel cell stacks comprising fluid ports with angled walls benefit from reduced pressure loss. Turbulence, which is believed to have adverse effects on the membrane electrode assemblies of solid polymer fuel cells, is also reduced.

37 Claims, 5 Drawing Sheets

ELECTROCHEMICAL FUEL CELL STACK WITH IMPROVED REACTANT MANIFOLDING AND SEALING

CROSS-REFERENCE TO RELATED APPLICATION(S)

This application is a continuation of U.S. patent application Ser. No. 09/471,564 filed Dec. 23, 1999, now U.S. Pat. No. 6,232,008, which is a continuation-in-part of U.S. patent application Ser. No. 09/116,270 filed Jul. 16, 1998, now U.S. Pat. No. 6,066,409. The '270 application in turn relates to and claims priority benefits from U.S. Provisional Patent Application Ser. No. 60/052,713 filed Jul. 16, 1997. The '564 and '270 applications, and the '713 provisional application, are incorporated herein by reference in their entireties.

FIELD OF THE INVENTION

The present invention relates to electrochemical fuel cell stacks. In particular, the invention provides an electrochemical solid polymer fuel cell stack with improved reactant manifolding and sealing.

BACKGROUND OF THE INVENTION

Electrochemical fuel cells convert reactants, namely, fuel and oxidant fluid streams, to generate electric power and reaction products. Electrochemical fuel cells employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

Solid polymer fuel cells typically employ a membrane electrode assembly ("MEA") consisting of a solid polymer electrolyte or ion exchange membrane disposed between two electrode layers. The membrane, in addition to being ion conductive (typically proton conductive) material, also acts as a barrier for isolating the reactant streams from each other.

The MEA is typically interposed between two separator plates that are substantially impermeable to the reactant fluid streams. The plates act as current collectors and provide support for the MEA. Surfaces of the separator plates that contact an electrode are referred to as active surfaces. The separator plates may have grooves or open-faced channels formed in one or both surfaces thereof, to direct the fuel and oxidant to the respective contacting electrode layers, namely, the anode on the fuel side and the cathode on the oxidant side. Such separator plates are known as flow field plates, with the channels, which may be continuous or discontinuous between the reactant inlet and outlet, being referred to as flow field channels. The flow field channels assist in the distribution of the reactant across the electrochemically active area of the contacted porous electrode. In some solid polymer fuel cells, flow field channels are not provided in the active surfaces of the separator plates, but the reactants are directed through passages in the porous electrode layer. Such passages may, for example, include channels or grooves formed in the porous electrode layer or may just be the interconnected pores or interstices of the porous material.

In a fuel cell stack, a plurality of fuel cells are connected together, typically in series, to increase the overall output power of the assembly. In such an arrangement, an active surface of the separator plate faces and contacts an electrode and a non-active surface of the plate may face a non-active surface of an adjoining plate. In some cases, the adjoining non-active separator plates may be bonded together to form a laminated plate. Alternatively both surfaces of a separator plate may be active. For example, in series arrangements, one side of a plate may serve as an anode plate for one cell and the other side of the plate may serve as the cathode plate for the adjacent cell, with the separator plate functioning as a bipolar plate. Such a bipolar plate may have flow field channels formed on both active surfaces.

The fuel stream that is supplied to the anode separator plate typically comprises hydrogen. For example, the fuel stream may be a gas such as substantially pure hydrogen or a reformate stream containing hydrogen. Alternatively, a liquid fuel stream such as aqueous methanol may be used. The oxidant stream, which is supplied to the cathode separator plate, typically comprises oxygen, such as substantially pure oxygen, or a dilute oxygen stream such as air.

A fuel cell stack typically includes inlet ports and supply manifolds for directing the fuel and the oxidant to the plurality of anodes and cathodes respectively. The stack often also includes an inlet port and manifold for directing a coolant fluid to interior passages within the stack to absorb heat generated by the exothermic reaction in the fuel cells. The stack also generally includes exhaust manifolds and outlet ports for expelling the unreacted fuel and oxidant gases, as well as an exhaust manifold and outlet port for the coolant stream exiting the stack. The stack manifolds, for example, may be internal manifolds, which extend through aligned openings formed in the separator layers and MEAs, or may comprise external or edge manifolds, attached to the edges of the separator layers.

Conventional fuel cell stacks are sealed to prevent leaks and inter-mixing of the fuel and oxidant streams. Fuel cell stacks typically employ fluid tight resilient seals, such as elastomeric gaskets between the separator plates and membranes. Such seals typically circumscribe the manifolds and the electrochemically active area. Applying a compressive force to the resilient gasket seals effects sealing.

Fuel cell stacks are compressed to enhance sealing and electrical contact between the surfaces of the plates and the MEAs, and between adjoining plates. In conventional fuel cell stacks, the fuel cell plates and MEAs are typically compressed and maintained in their assembled state between a pair of end plates by one or more metal tie rods or tension members. The tie rods typically extend through holes formed in the stack end plates, and have associated nuts or other fastening means to secure them in the stack assembly. The tie rods may be external, that is, not extending through the fuel cell separator plates and MEAs, however, external tie rods can add significantly to the stack weight and volume. It is generally preferable to use one or more internal tie rods which extend between the stack end plates through openings in the fuel cell separator plates and MEAs as, for example, described in U.S. Pat. No. 5,484,666. Typically springs, hydraulic or pneumatic pistons, pressure pads or other resilient compressive means are utilized to cooperate with the tie rods and end plates to urge the two end plates towards each other to compress the fuel cell stack components.

The passageways which fluidly connect each electrode to the appropriate stack supply and/or exhaust manifolds typically comprise one or more open-faced fluid channels formed in the active surface of the separator plate, extending from a reactant manifold to the area of the plate which corresponds to the electrochemically active area of the contacted electrode. In this way, for a flow field plate, fabrication is simplified by forming the fluid supply and exhaust channels on the same face of the plate as the flow field channels. However, such channels may present a problem for the resilient seal, which is intended to fluidly isolate the other electrode (on the opposite side of the ion exchange membrane) from this manifold. Where a seal on the other side of the membrane crosses over open-faced channels extending from the manifold, a supporting surface is required to bolster the seal and to prevent the seal from leaking and/or sagging into the open-faced channel. One solution adopted in conventional separator plates is to insert a bridge member that spans the open-faced channels underneath the resilient seal. The bridge member preferably provides a sealing surface that is flush with the sealing surface of the separator plate so that a gasket-type seal on the other side of the membrane is substantially uniformly compressed to provide a fluid tight seal. The bridge member also prevents the gasket-type seal from sagging into the open-faced channel and restricting the fluid flow between the manifold and the electrode. Instead of bridge members, it is also known to use metal tubes or other equivalent devices for providing a continuous sealing surface around the electrochemically active area of the electrodes (see, for example, U.S. Pat. No. 5,570,281), whereby passageways, which fluidly interconnect each electrode to the appropriate stack supply or exhaust manifolds, extend laterally within the thickness of a separator or flow field plate, substantially parallel to its major surfaces.

Conventional bridge members are affixed to the separator plates after the plates have been milled or molded to form the open-faced fluid channels. One problem with this solution is that separate bridge members add to the number of separate fuel cell components that are needed in a fuel cell stack. Further, the bridge members are typically bonded to the separator plates, so care must be exercised to ensure that the relatively small bridge members are accurately installed and that the bonding agent does not obscure the manifold port. It is also preferable to ensure that the bridge members are installed substantially flush with the sealing surface of the separator plate. Accordingly, the installation of conventional bridge members on separator plates adds significantly to the fabrication time and cost for manufacturing separator plates for fuel cell assemblies. Therefore, it is desirable to obviate the need for such bridge members, and to design an electrochemical fuel cell stack so that the fluid reactant streams are not directed between the separator plates and MEA seals.

SUMMARY OF THE INVENTION

In the present approach, passageways fluidly interconnecting an anode to a fuel manifold, or interconnecting a cathode to an oxidant manifold, in an electrochemical fuel cell stack are formed between the non-active surfaces of a pair of adjoining separator plates. The passageway then extends through one or more ports penetrating the thickness of one of the plates thereby fluidly connecting the manifold to the opposite active surface of that plate, and the contacted electrode. The ports that penetrate the thickness of one of the plates, are angled ports, such that the fluid flowing from one side of plate to the opposite side is not directed against any perpendicular surfaces. That is, the surfaces of the ports are not perpendicular to the plane of the plates, but are angled and/or curved to reduce turbulence and pressure loss.

The non-active surfaces of adjoining separator plates in a fuel cell stack can thus cooperate to provide passageways for directing at least one of the reactant from a respective fuel or oxidant manifold to the appropriate electrodes. In cases where the non-active surfaces of two adjoining separator plates accommodate both the oxidant and fuel reactant streams, the fuel and oxidant reactant streams are, of course, fluidly isolated from each other. Coolant passages may also be conveniently provided between the non-active surfaces of adjoining separator plates.

In other words, the fluid port directs the fluid at an angle between 0 degrees and 90 degrees from the direction of fluid flow in the passageway directly upstream of the fluid path. In this disclosure, 0 degrees is defined as being parallel to the direction of the fluid flow in the passageway upstream of the fluid port and 90 degrees is defined as being perpendicular to the direction of the fluid flow in the passageway upstream of the fluid port. That is, the fluid port walls are shaped so that the fluid flow vectors are not directed against any walls that are angled more than 90 degrees from the fluid flow vector. Preferably the effective angle of the fluid port walls is between about 20 degrees and about 45 degrees with respect to the direction of the fluid flow in the passageway upstream of the fluid port.

In a preferred embodiment, the non-active surfaces of adjoining separator plates provide fluid passageways for both the fuel and oxidant streams, which are, of course, fluidly isolated from each other. That is, within the electrochemical fuel cell stack:

at least one of the fuel stream passageways traverses a portion of one of the adjoining non-active surfaces of a pair of the separator plates, and the at least one fuel stream passageway comprises a fuel fluid port fluidly connecting a portion of the fuel stream passageway on the non-active surface, with the active surface of one of the pair of plates;

at least one of the oxidant stream passageways traverses a portion of one of the adjoining non-active surfaces of a pair of the separator plates, and the at least one oxidant stream passageway comprises an oxidant fluid port fluidly connecting a portion of the oxidant stream passageway on the non-active surface, with the active surface of the other of the pair of plates; and the fuel fluid port and the oxidant fluid port each comprise walls that are angled more than 0 degrees and less than 90 degrees with respect to the direction of fluid flow in the respective fuel and oxidant passageways upstream of the respective fluid port.

In preferred embodiments, to further reduce turbulence the fluid port walls are curved. For example, the fluid port walls may be convex. The fluid port walls may also be curved more than one direction. For example, the walls may be curved in both the in-plane and through-plane directions (wherein the "plane" is defined herein as the plane of the active surface).

In one embodiment the angled fluid port is in the shape of an elongated slot and is fluidly connected to a plurality of fluid channels formed in the active surface.

In any of the above embodiments, the separator plates may be flow field plates wherein the active surfaces have reactant flow field channels formed therein, for distributing reactant streams from the supply manifolds across at least a portion of the contacted electrodes. In such cases the angled fluid ports may fluidly connect passageways on the non-active plate surfaces to reactant flow field channels on the active plate surface.

Fuel cell separator plates incorporating the disclosed features may be made from any materials that are suitable for fuel cell separator plates. Preferred properties for fuel cell separator plate materials include impermeability to reactant fluids, electrical conductivity, chemical compatibility with fuel cell reactant fluids and coolants, and physical compatibility with the anticipated operating environment, including temperature and the humidity of the reactant streams. For example, carbon composites have been disclosed herein as suitable materials. Expanded graphite composites may also be suitable materials. The disclosed discrete fluid distribution channels may be formed, for example, by embossing a sheet of expanded graphite material. Composite plate materials may further comprise a coating to improve one or more of the plate's desired properties. Persons skilled in the art will understand that the present separator plates may be made from other materials that are used to make conventional separator plates, such as, for example, metal.

When expanded graphite is the material selected for the separator plates, the fluid ports, in addition to other features of the plate, such as, for example, the fluid passageways, and flow field channels, may be made by embossing a sheet of deformable expanded graphite. A pair of embossing dies may comprise features that cooperate with one another to form features such as the fluid ports. When a carbon composite is the material selected for the separator plates, the fluid ports and other features such as the flow field channels and non-active surface passageways may be molded.

The electrochemical fuel cell stack may optionally further comprise reactant exhaust manifolds for directing a reactant stream from one, or preferably more, of the fuel cell electrodes. In preferred embodiments, reactant stream passageways fluidly interconnecting the reactant exhaust manifolds to the electrodes also traverse a portion of adjoining non-active surfaces of a pair of separator plates and comprise angled exhaust ports fluidly connecting the non-active surface of the plates to the respective active surfaces.

In further embodiments passages for a coolant may also be formed between co-operating non-active surfaces of adjoining anode and cathode plates, or one or more coolant channels may be formed in the active surface of at least one of the cathode and/or the anode separator plates. In an operating stack, a coolant may be actively directed through the cooling channels or passages by a pump or fan, or alternatively, the ambient environment may passively absorb the heat generated by the electrochemical reaction within the fuel cell stack.

As mentioned above, passageways for both the fuel and oxidant reactant streams may extend between adjoining non-active surfaces of the same pair of plates, but the passageways are fluidly isolated from each other. To improve the sealing around the reactant stream passageways located between adjoining non-active surfaces of the separator plates, the fuel cell stack may further comprise one or more gasket seals interposed between the adjoining non-active surfaces. Alternatively, or in addition to employing gasket seals, adjoining separator plates may be adhesively bonded together. To improve the electrical conductivity between the adjoining plates, the adhesive is preferably electrically conductive. Other known methods of bonding and sealing the adjoining separator plates may be employed.

In any of the embodiments of an electrochemical fuel cell stack described above, the manifolds may be selected from various types of stack manifolds, for example internal manifolds comprising aligned openings formed in the stacked membrane electrode assemblies and separator plates, or external manifolds extending from an external edge face of the fuel cell stack.

As used herein, adjoining components are components that are in contact with one another, but are not necessarily bonded or adhered to one another. Thus, the terms "adjoin" and "contact" are intended to be synonymous.

DETAILED DESCRIPTION OF PREFERRED EMBODIMENT(S)

Figure 1:
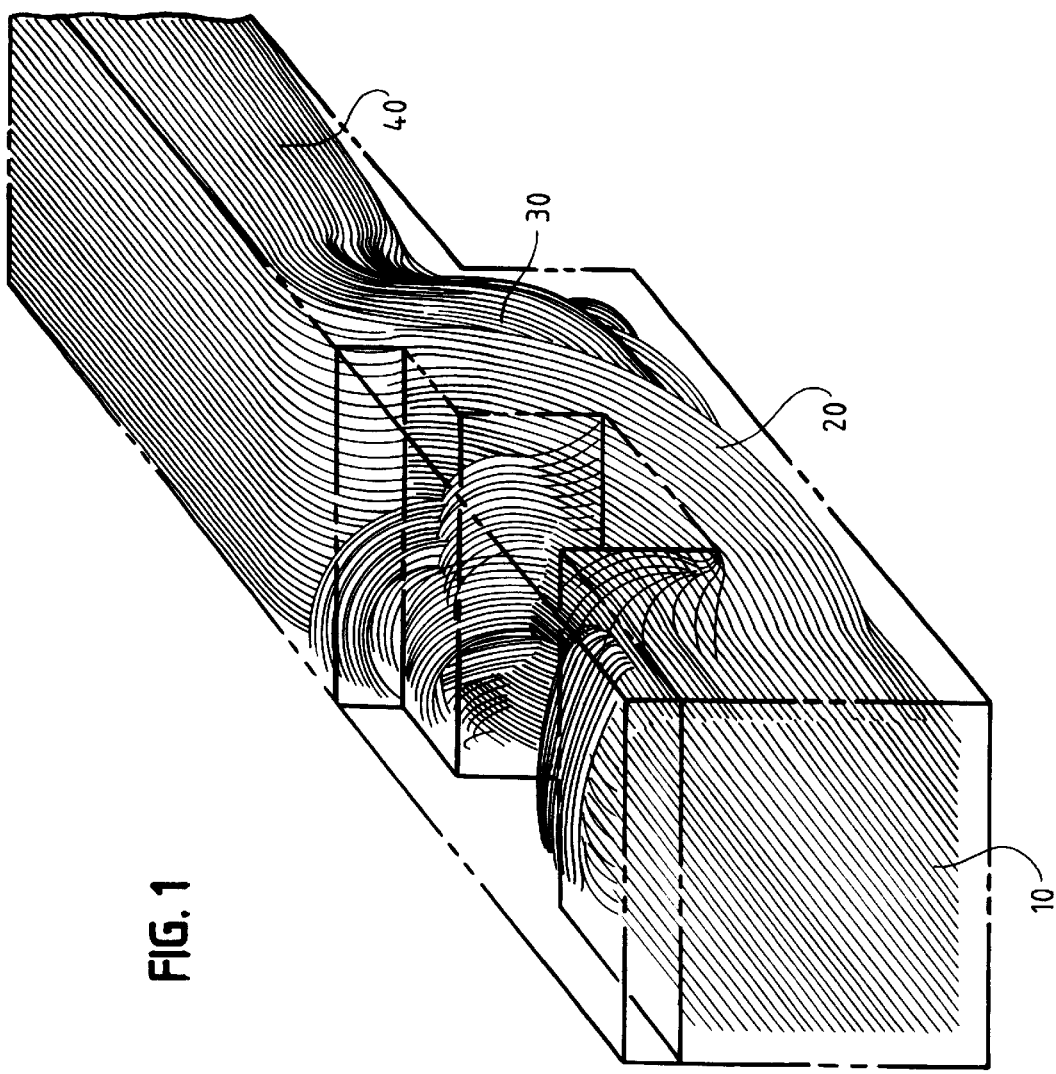
FIG. 1 is an illustration of the results of a vectoral flow analysis for a separator plate that comprises a fluid port with walls that are perpendicular to the direction of fluid flow in the passageway extending from the manifold.

FIG. 1 is an illustration of the results of a vectoral flow analysis that depicts the flow vectors of a fluid that is directed from manifold 10, through passageway 20 on one side of a separator plate (not shown), through port 30, and then to channel 40 on the opposite side of the separator plate. In FIG. 1, the bold, solid lines are indicative of the outline of the flow passageway. The bold, broken lines in FIG. 1 are indicative of some, but not all, of the transverse edges of the passageway. In this analysis, passageway 20 corresponds, for example, to a passageway associated with the non-active surface of the separator plate, and channel 40 corresponds, for example, to a channel associated with the active surface of the separator plate. In the example of FIG. 1, port 30 comprises walls that are substantially perpendicular to the major substantially planar surfaces of the separator plate. That is, the walls of port 30 are oriented substantially 90 degrees with respect to the direction of fluid flow in passageway 20.

Known fuel cell separator plates (not shown) that employ bridges and fluid passageways extending from manifolds to flow field channels on the active surface of the separator plate provide a substantially straight fluid path. That is, the fluid path is substantially parallel to the plane of the active surface, and substantially laminar flow is expected in the passageway between the manifold and the fluid flow field area. Accordingly, the effect of turbulence between the fluid manifolds and the flow field area was not a concern with fuels cells using separator plates with this design.

For fuel cell separator plates providing a fluid path like the one shown in FIG. 1, turbulence may be a concern because the turbulence results in increased pressure losses. In addition, in solid polymer fuel cells employing "perpendicular" ports like port 30, the fluid exiting port 30 typically impinges directly on the electrode and enters directly into the active area where turbulence may have an adverse effect on the electrode and membrane electrolyte. In particular, empirical data shows that the portions of the membrane opposite ports like port 30 are locations where degradation of the membrane is more likely to occur.

Figure 2:
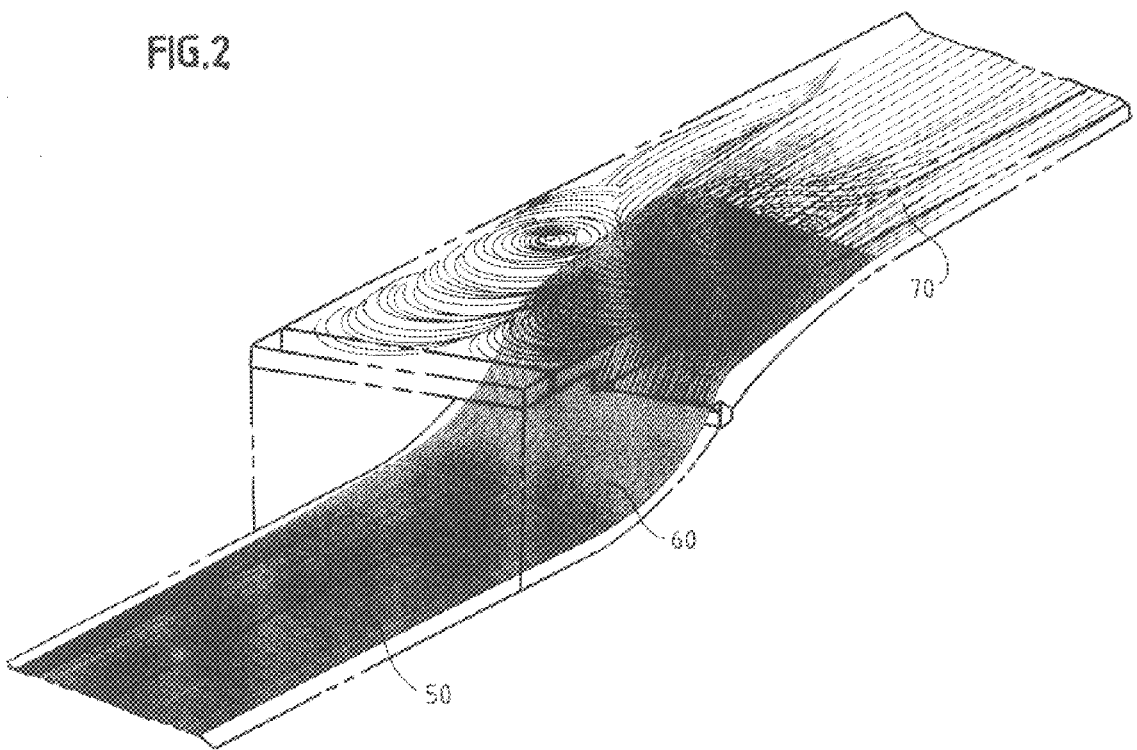
FIG. 2 is an illustration of the results of a vectoral flow analysis for a separator plate that comprises a fluid port with walls that are angled with respect to the direction of fluid flow in the passageway extending from the manifold.

FIG. 2 is an illustration of the results of a vectoral flow analysis that depicts the flow vectors of a fluid that is directed from a manifold (not shown), through passageway 50 on one side of a separator plate (not shown), through angled port 60, and then to channel 70 on the opposite side of the separator plate. In this analysis, passageway 50 corresponds, for example, to a passageway associated with the non-active surface of the separator plate, and channel 70 corresponds, for example, to a channel associated with the active surface of the separator plate. In the example of FIG. 2, port 60 comprises walls that are curved and are angled more than 0 degrees and less than 90 degrees with respect to the direction of fluid flow in passageway 50. In the example of FIG. 2, the effective angle of port 60, with respect to the direction of fluid flow in passageway 50 is about 30 degrees. A comparison of the results depicted in FIGS. 1 and 2 demonstrates a much-reduced amount of turbulence that was unexpected given the thickness of typical fuel cell separator plates. To reduce the weight and volume of fuel cell stacks, separator plates are generally made thin. For example, typical fuel cell separator plates are less than 5 millimeters thick. Accordingly, the offset is typically small between the passageway (for example, passageway 50) and the flow field channel (for example, channel 70) which are both formed within the thickness of the plate (that is, on the non-active surface and the active surface, respectively).

Figure 3:
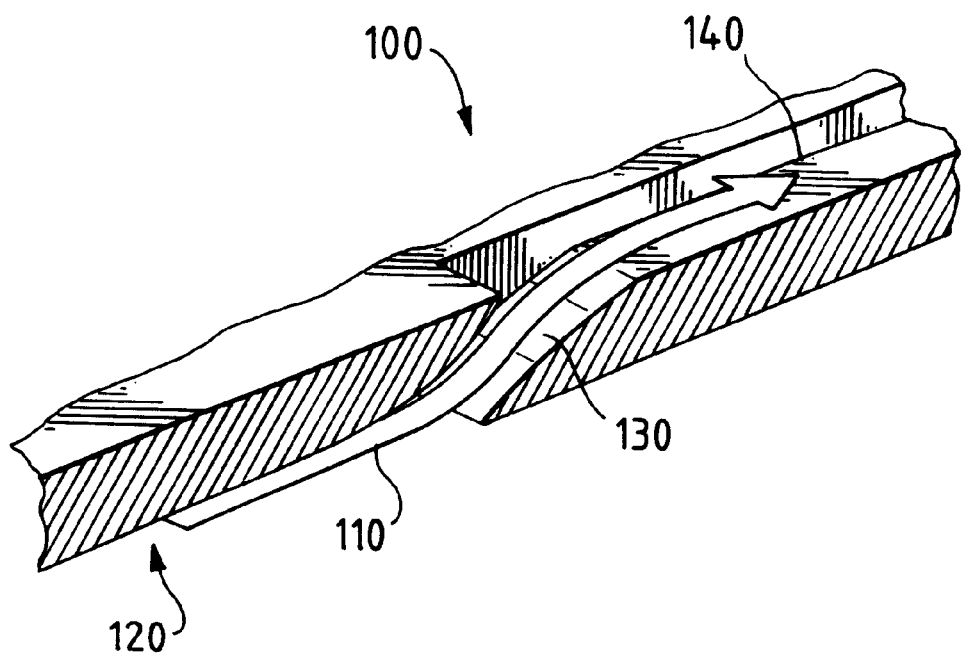
FIG. 3 is a partial three-dimensional section view of a separator plate that comprises an angled fluid port.

FIG. 3 is a partial three dimensional sectional view of separator plate 100. The reactant fluid flows generally in the direction of arrow 110, from a passageway 120, through port 130 and into channel 140. The walls of port 130 are angled with respect to the direction of fluid flow in passageway 120 by an angle of about 20 degrees. Further, the walls of port 130 are curved in the through plane direction in a convex shape to provide a sturdier leading edge that is less susceptible to damage.

Figure 4:
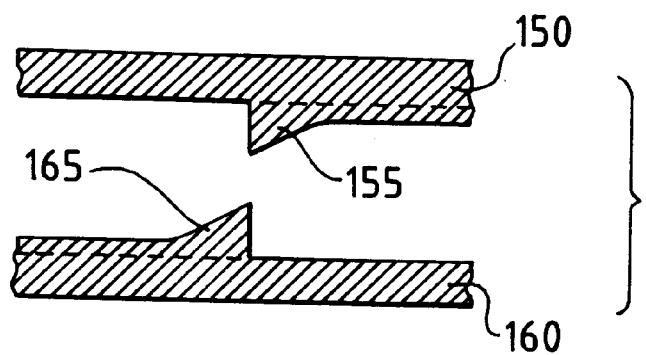
FIG. 4 is a partial section view of two plates that may used as embossing dies or mold plates for forming the separator plate shown in FIG. 3.

FIG. 4 is a partial section detail view of two embossing dies or mold plates that may be employed in cooperation with each other to form an angled port like port 130 in FIG. 3. For example, in the case where plates 150 and 160 are embossing dies, a compressible formable material such as, expanded graphite, is placed between plates 150 and 160. When plates 150 and 160 are pressed together, raised portion 155, for example, forms passageway 120 and half of port 130, and raised portion 165 forms channel 140 and the other half of port 130. Alternatively, when plates 150 and 160 are mold plates, the plates are pressed together and then the uncured plate material is injected into the mold, filling the void spaces. The uncured plate material is then cured in the mold. After curing, plates 150 and 160 are separated, releasing a molded plate comprising features like those of the plate illustrated in FIG. 3.

Figure 5A:
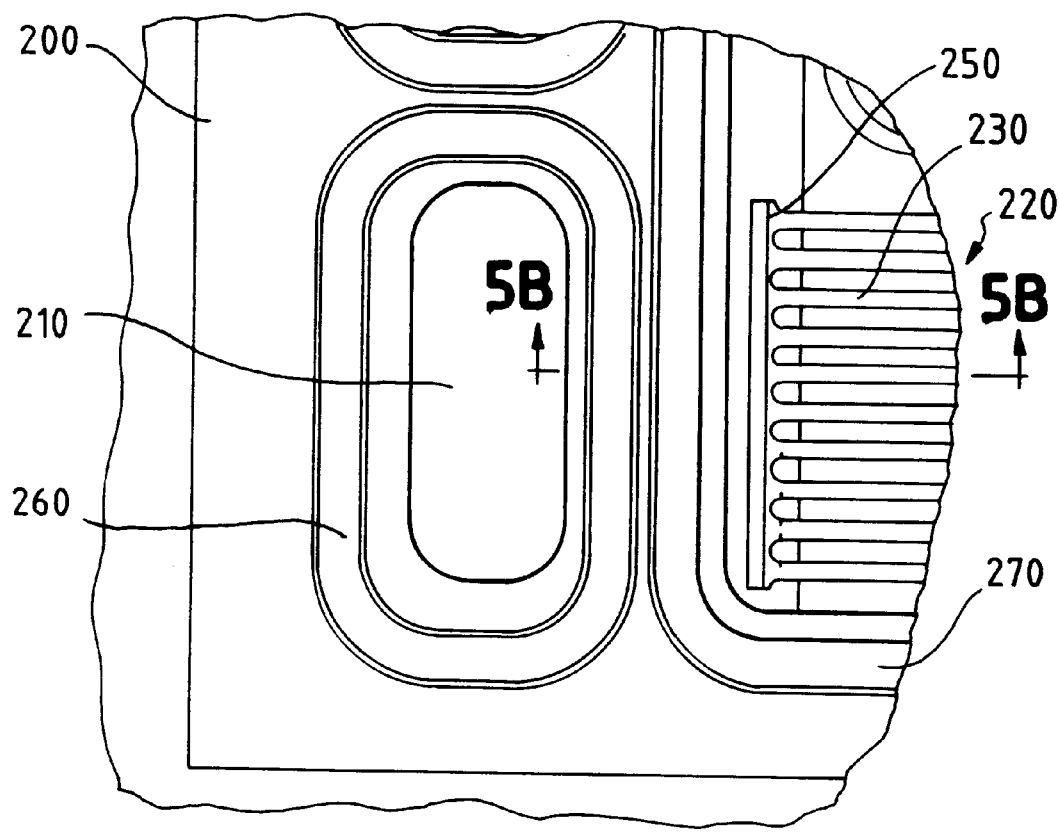
FIG. 5A is a partial plan view of a separator plate that comprises a fluid port in the shape of a slot.
Figure 5B:
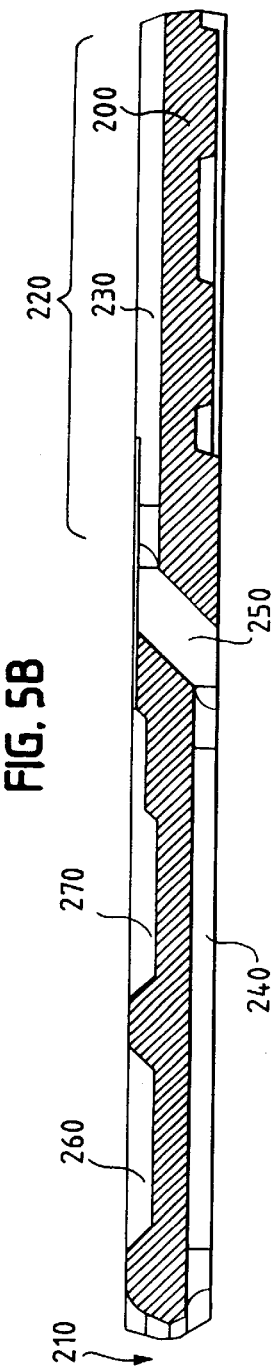
FIG. 5B is a partial section view of the separator plate of FIG. 5A.

FIG. 5A is a partial plan view of separator plate 200, which comprises fluid manifold 210 and flow field area 220 which comprises reactant channels 230. Fluid is directed from manifold 210 to channels 230 via fluid passageway 240 on the opposite surface of the plate (shown in the partial section view in FIG. 5B) and angled fluid port 250 (shown in both FIGS. 5A and 5B). Separator plate 200 further comprises grooves 260 and 270 for accommodating seals for fluidly isolating manifold 210 and flow field area 220. Section line B—B, in FIG. 5A, indicates the location of the section view shown in FIG. 5B. In this example, fluid port 250 is in the shape of an elongated slot that is fluidly connected to a plurality of channels 230.

Figure 6:
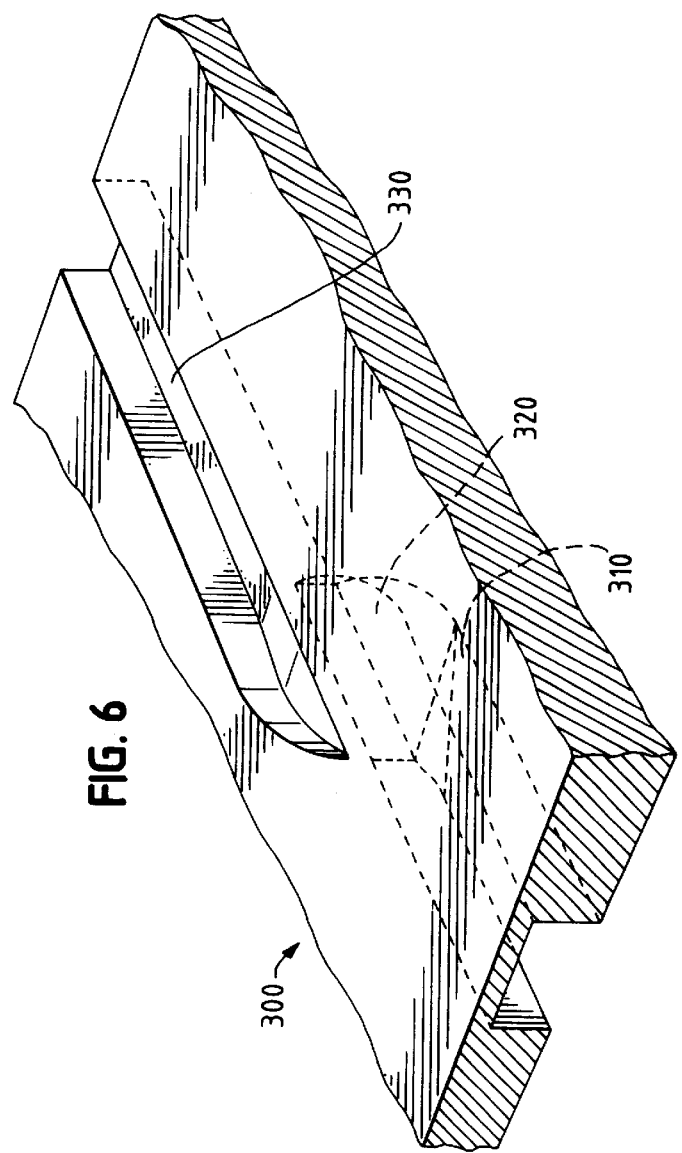
FIG. 6 is a partial three-dimensional view of a separator plate that comprises a fluid passage that fluidly connects the non-active and active surfaces of the plate, wherein the fluid passage is curved in the through-plane and in-plane directions.

In the embodiment illustrated in FIG. 6, separator plate 300 comprises passageway 310, fluid port 320, and flow field channel 330. In this embodiment, fluid port 320 curves in both the through-plane direction and the in-plane direction. Like other embodiments disclosed herein, fluid passageway 310, fluid port 320, and flow field channel 330 may all be formed by embossing dies or plates, similar to those shown in FIG. 4.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A fuel cell stack comprising:
   (a) a plurality of membrane electrode assemblies each comprising an anode, a cathode and an ion exchange membrane interposed between said anode and cathode;
   (b) a pair of separator plates interposed between adjacent pairs of said plurality of membrane electrode assemblies, said pair of separator plates comprising:
      an anode plate having an active surface contacting said anode and an oppositely facing non-active surface, and
      a cathode plate having an active surface contacting said cathode and an oppositely facing non-active surface adjoining said non-active surface of said anode plate;
   (c) at least one reactant stream passageway traversing a portion of said non-active surface of at least one of said separator plates; and
   (d) a fluid port fluidly connecting said portion of said passageway on said non-active surface with said active surface of said separator plate.

2. The fuel cell stack of claim 1 wherein said active surface comprises at least one channel fluidly connected to said fluid port.

3. The fuel cell stack of claim 1 wherein said fluid port is in the shape of an elongated slot and is fluidly connected to a plurality of fluid channels formed in said active surface.

4. The fuel cell stack of claim 1 wherein said separator plate is molded and said fluid port is formed by a mold.

5. The fuel cell stack of claim 1 wherein said separator plate is embossed and said fluid port is formed by a raised feature on an embossing die.

6. The fuel cell stack of claim 1 wherein said portion of said reactant stream passageway that traverses said non-active surface of said separator plate comprises a groove formed in said separator plate.

7. The fuel cell stack of claim 1 further comprising coolant passages formed in said non-active surface of said separator plate.

8. The fuel cell stack of claim 1 further comprising coolant passages formed in said active surface of said separator plate.

9. The fuel cell stack of claim 1 further comprising an internal manifold opening therein, wherein said portion of said reactant stream passageway that traverses said non-active surface of said separator plate is fluidly connected to said manifold opening.

10. The fuel cell stack of claim 1 wherein said fluid port comprises walls that are angled more than 0 degrees and less than 90 degrees with respect to the direction of fluid flow in said passageway upstream of said fluid port.

11. The fuel cell stack of claim 10 wherein said fluid port comprises walls that are angled more than about 20 degrees and less than about 45 degrees with respect to the direction of fluid flow in said passageway upstream of said fluid port.

12. The fuel cell stack of claim 10 wherein said fluid port comprises walls that are angled about 20 degrees with respect to the direction of fluid flow in said passageway upstream of said fluid port.

13. The fuel cell stack of claim 10 wherein said fluid port comprises walls that are angled about 45 degrees with respect to the direction of fluid flow in said passageway upstream of said fluid port.

14. The fuel cell stack of claim 10 wherein said fluid port walls are curved to reduce turbulence within said fluid port.

15. The fuel cell stack of claim 14 wherein at least one of said fluid port walls is convex.

16. The fuel cell stack of claim 14 wherein said fluid port walls are curved both in the in-plane and through-plane directions, and wherein said plane is the plane of said active surface.

17. A fuel cell separator plate comprising:
(a) an active surface;
(b) an oppositely facing non-active surface;
(c) an internal reactant supply manifold opening formed in said non-active surface;
(d) at least one reactant stream supply channel formed in said non-active surface, said supply channel fluidly connected to said supply manifold opening and traversing a portion of said non-active surface of said separator plate;
(e) a fluid supply port fluidly connecting said supply channel with said active surface of said separator plate;
(f) an internal reactant exhaust manifold opening formed in said active surface;
(g) at least one reactant stream exhaust channel formed in said non-active surface, said exhaust channel fluidly connected to said exhaust manifold opening and traversing a portion of said non-active surface of said separator plate; and
(h) a fluid exhaust port fluidly connecting said exhaust channel with said active surface of said separator plate.

18. The separator plate of claim 17 wherein each of said supply and exhaust ports comprise walls that are angled more than 0 degrees and less than 90 degrees with respect to the direction of fluid flow in the channel upstream of respective said port.

19. A fuel cell separator plate comprising:
(a) an anode plate having an active surface and an oppositely facing non-active surface;
(b) a cathode plate having an active surface and an oppositely facing non-active surface adjoining said non-active surface of said anode plate; and
(c) wherein at least one of said fuel and oxidant stream channels also traverses a portion of said adjoining non-active surfaces of said anode and cathode plates and wherein said at least one of said fuel and oxidant stream channels comprises a fluid port fluidly connecting said portion of said channel on said non-active surface with said active surface of one of said pair of separator plates.

20. The fuel cell plate of claim 19 wherein said fluid port comprises walls that are angled more than 0 degrees and less than 90 degrees with respect to the direction of fluid flow in said passageway upstream of said fluid port.

21. The fuel cell plate of claim 20 wherein said fluid port comprises walls that are angled more than about 20 degrees and less than about 45 degrees with respect to the direction of fluid flow in said passageway upstream of said fluid port.

22. The separator plate of claim 20 wherein said fluid port comprises walls that are angled about 20 degrees with respect to the direction of fluid flow in said passageway upstream of said fluid port.

23. The separator plate of claim 22 wherein said adjoining non-active surfaces are bonded together using an electrically conductive adhesive.

24. The separator plate of claim 20 wherein said fluid port comprises walls that are angled about 45 degrees with respect to the direction of fluid flow in said passageway upstream of said fluid port.

25. The separator plate of claim 20 wherein said fluid port walls are curved to reduce turbulence within said fluid port.

26. The separator plate of claim 25 wherein at least one of said fluid port walls is convex.

27. The separator plate of claim 25 wherein said fluid port walls are further curved in both the in-plane and through-plane directions, and wherein said plane is the plane of said active surface.

28. The fuel cell plate of claim 19 further comprising coolant passages formed between cooperating non-active surfaces of said anode and cathode plates.

29. The separator plate of claim 19 wherein said adjoining non-active surfaces of said anode plate and said cathode plate are bonded together.

30. An electrochemical fuel cell stack comprising:
(a) a plurality of membrane electrode assemblies each comprising an anode, a cathode, and an ion exchange membrane interposed between said anode and cathode;
(b) a pair of separator plates interposed between adjacent pairs of said plurality of membrane electrode assemblies, said pair of separator plates comprising:
an anode plate having an active surface contacting said anode, and an oppositely facing non-active surface, and
a cathode plate having an active surface contacting said cathode, and an oppositely facing non-active surface adjoining said non-active surface of said anode plate;
(c) a fuel supply manifold for directing a fuel stream to at least one of said anodes;
(d) an oxidant supply manifold for directing an oxidant stream to at least one of said cathodes; and
(e) fuel and oxidant stream passageways fluidly connecting said fuel and oxidant supply manifolds to at least one of said anodes and at least one of said cathodes, respectively, wherein at least one of said fuel and oxidant stream passageways traverses a portion of said adjoining non-active surfaces of a pair of said separator plates and said at least one passageway comprises a fluid port fluidly connecting said portion of said passageway on said non-active surface with said active surface of one of said pair of separator plates.

31. The electrochemical fuel cell stack of claim 30 wherein passages for a coolant are formed between cooperating non-active surfaces of a pair of said separator plates.

32. The electrochemical fuel cell stack of claim 30 wherein, for each of said pairs of separator plates, said adjoining non-active surfaces of said anode plate and said cathode plate are bonded together.

33. The electrochemical fuel cell stack of claim 32 wherein said adjoining non-active surfaces are bonded together using an electrically conductive adhesive.

34. The electrochemical fuel cell stack of claim 30 wherein said at least one of said fuel and oxidant stream passageways comprise open-faced channels formed in said non-active surface of one plate of said pair of separator plates.

35. The electrochemical fuel cell stack of claim 30 wherein said at least one of said fuel and oxidant stream passageways comprise open-faced channels formed in the non-active surfaces of both plates of said pair of separator plates.

36. The electrochemical fuel cell stack of claim 30 further comprising an oxidant exhaust manifold for directing an oxidant stream from at least one of said cathodes wherein an oxidant stream passageway fluidly interconnecting said oxidant exhaust manifold to a cathode traverses a portion of adjoining non-active surfaces of a pair of said separator plates.

37. The electrochemical fuel cell stack of claim 30 further comprising a fuel exhaust manifold for directing a fuel stream from at least one of said anodes wherein a fuel stream passageway fluidly interconnecting said anode exhaust manifold to an anode traverses a portion of adjoining non-active surfaces of a pair of said separator plates.

* * * * *